United States Patent
Mangudi et al.

(10) Patent No.: US 11,539,294 B2
(45) Date of Patent: Dec. 27, 2022

(54) MULTI-LEVEL POWER CONVERTER WITH LIGHT LOAD FLYING CAPACITOR VOLTAGE REGULATION

(71) Applicant: Dialog Semiconductor (UK) Limited, London (GB)

(72) Inventors: Aravind Mangudi, Gilbert, AZ (US); Mark Mercer, Phoenix, AZ (US); James Steele, Chandler, AZ (US); Taek Chang, Gilbert, AZ (US); Bill McKillop, Gilbert, AZ (US)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/050,746

(22) Filed: Jul. 31, 2018

(65) Prior Publication Data
US 2020/0044578 A1    Feb. 6, 2020

(51) Int. Cl.
*H02M 3/158* (2006.01)
*H02M 1/00* (2006.01)

(52) U.S. Cl.
CPC .......... *H02M 3/158* (2013.01); *H02M 1/0032* (2021.05)

(58) Field of Classification Search
CPC ........ H02M 3/07; H02M 3/155; H02M 3/156; H02M 3/1563; H02M 3/157; H02M 3/158;
(Continued)

(56) References Cited

U.S. PATENT DOCUMENTS 8,493,754 B1 * 7/2013 Wambsganss ...... H02M 1/4216
323/284
9,866,113 B1 * 1/2018 Assaad ................... H02M 3/07
(Continued)

FOREIGN PATENT DOCUMENTS

DE    10 2017 216 757 A1    12/2018

OTHER PUBLICATIONS

"Development of High Power Density Flying Capacitor Multi-level Converters with Balanced Capacitor Voltage," by Hidemine Obara et al., 2012 IEEE Energy Conversion Congress and Exposition (ECCE), Sep. 15-20, 2012, pp. 330-336.
(Continued)

*Primary Examiner* — Thienvu V Tran
*Assistant Examiner* — Ivan Laboy
(74) *Attorney, Agent, or Firm* — Saile Ackerman LLC; Stephen B. Ackerman (57) ABSTRACT

A multi-level power converter and a method using first, second, third and fourth switching elements, an inductor, and a flying capacitor are presented. A first terminal of the inductor may be connected to a switching terminal connecting the second and third switching elements. A first terminal of the flying capacitor may be connected to a terminal connecting the first and second elements. A second terminal of the flying capacitor may be connected to a terminal connecting the third and fourth switching elements. The multi-level power converter may have a first feedback circuit to generate control signals for setting the switching elements in a plurality of switching states for regulating an output voltage or an output current. The converter may have a second feedback circuit to generate control signals to allow the flying capacitor to be charged or discharged using an inductor current flowing through the inductor.

22 Claims, 7 Drawing Sheets

(58) Field of Classification Search
CPC ...... H02M 3/1588; H02M 1/08; H02M 1/088;
H02M 2001/0003; H02M 2001/0019;
H02M 2001/0025; H02M 2001/0029;
H02M 2001/0032; H02M 2001/0041;
H02M 2001/0054; H02M 2003/072
See application file for complete search history.

(56) References Cited

U.S. PATENT DOCUMENTS

| | | |
|---|---|---|
| 9,929,653 B1 | 3/2018 | Mercer et al. |
| 2011/0018511 A1* | 1/2011 | Carpenter ............. H02M 3/158 323/282 |
| 2012/0307533 A1* | 12/2012 | Gekeler ................ H02M 7/487 363/41 |
| 2016/0190921 A1 | 6/2016 | Kumar et al. |
| 2019/0058385 A1* | 2/2019 | Lazaro .................... H02M 1/08 |

OTHER PUBLICATIONS

"Capacitor Voltage Balancing Control of Multilevel DC-DC Converter," by Levy F. Costa et al., 2013 Brazilian Power Electronics Conference, Oct. 27-31, 2013, pp. 332-338.
German Office Action, File No. 10 2019 206 970.3, Applicant: Dialog Semiconductor (UK) Limited, dated Sep. 11, 2020, 6 pages.
German Office Action, File No. 10 2019 206 970.3, Applicant: Dialog Semiconductor (UK) Limited, dated Apr. 5, 2022, 5 pages.

* cited by examiner

MULTI-LEVEL POWER CONVERTER WITH LIGHT LOAD FLYING CAPACITOR VOLTAGE REGULATION

TECHNICAL FIELD

The present document relates to multi-level power converters. In particular, the present document relates to multi-level buck and boost converters configured to regulate the voltage of flying capacitor under light load conditions.

BACKGROUND

System level specifications for power converters have become increasingly stringent in the last years. This is especially the case with regard to power converters used in portable electronic devices. On the one hand, power converter operating efficiency is critical as it has a direct influence on battery lifetime as well as power density and the related form factor of the portable electronic device. On the other hand, the power converter must not only provide operating power for the device, but must also provide a regulated output to manage battery charging functions.

Multi-level power converter topologies such as e.g. the multi-level buck converter are a promising approach to alleviate many of the shortcomings of conventional power converter topologies. In a multi-level buck converter, for example, two high-side switches connected in series replace the single high-side switch of the traditional buck converter. Moreover, two low-side switches connected in series replace the single low-side switch of the traditional buck converter and a so-called flying capacitor is connected in parallel to the series connection of the lower high-side switch and the higher low-side switch.

A major advantage of the multi-level buck converter is that the root mean square RMS voltage on the inductor node is only 50% of the corresponding voltage of a traditional buck converter. In addition to reducing the RMS voltage across and the RMS current though the inductor, the voltages across the switching capacitors is also reduced, thus lowering switching losses. Furthermore, transistors with lower breakdown voltage ratings typically have lower drain-source resistances Rds, resulting in reduced conductive losses.

However, there is a need to control the flying capacitor voltage. This is in particular true in no-load or light load operating conditions. For instance, during light load conditions, the power converter may be controlled such that the two high-side switches are switched simultaneously and the two low-side switches are switched simultaneously. In this exemplary scenario, ideally, the two high-side switches (or the two low-side switches, alternatively) should turn off at the same time and the voltage over the flying capacitor should float at e.g. half of the input voltage of the power converter. But non-idealities in the transitions cause one switch to turn off earlier than the other, causing the flying capacitor to either charge high to the input voltage or discharge to ground. The resulting charging and discharging of the flying capacitor may trigger fault conditions. Specifically, the charging of the flying capacitor may cause an over-voltage OV alarm, whereas the discharging of the flying capacitor may cause an under-voltage UV alarm. In response to the OV alarm, the flying capacitor voltage is lowered and, in response to the UV alarm, the flying capacitor voltage is increased. But the triggering of these alarms and the subsequent correction of the flying capacitor voltage wastes power and may also cause audible noise.

SUMMARY

The present document addresses the above mentioned technical problems and relates to novel ways of controlling and implementing multi-level power converters. In particular, the present document addresses the technical problem of providing feedback circuits for efficiently regulating the voltage across the flying capacitor in low load conditions. According to an aspect, a multi-level power converter comprises a first switching element, a second switching element, a third switching element, a fourth switching element, an inductor, and a flying capacitor. A first terminal of said inductor may be connected to a switching terminal connecting the second switching element and the third switching element. A first terminal of said flying capacitor may be connected to a terminal connecting the first switching element and the second switching element, and a second terminal of said flying capacitor may be connected to a terminal connecting the third switching element and the fourth switching element. The multi-level power converter may further comprise a first feedback circuit configured to generate control signals for setting the switching elements in a plurality of switching states for regulating an output voltage or an output current of the multi-level power converter. Further, the multi-level power converter may comprise a second feedback circuit configured to generate, based on a capacitor voltage across the flying capacitor, temporary control signals for setting the switching elements in a temporary switching state in which the flying capacitor is charged or discharged using an inductor current flowing through the inductor.

Each of the four switching elements may be implemented with any suitable device, such as, for example, a metal-oxide-semiconductor field effect transistor MOSFET, an insulated-gate bipolar transistor IGBT, a MOS-gated thyristor, or other suitable power devices. Each switching element may have a gate to which a respective driving voltage may be applied for turning the switching element on or off. More specifically, the temporary control signals generated by the second feedback circuit may be applied as driving voltages to said gates.

In principal, in a specific switching state, each of the four switching elements may be either turned off (i.e. open) or turned on (i.e. closed), resulting in 16 switching states which are thinkable in theory. In practice, however, the first feedback circuit may be configured to switch e.g. between 3 or 4 different switching states during normal operation of the multi-level power converter, and e.g. between 2 different switching states during low load operation as will be described below in greater detail.

The described multi-level power converter enables efficient regulation of the capacitor voltage by redirecting the inductor current during temporary switching states, thereby re-using the energy which is typically provided to a load of the multi-level power converter. Further, the provisioning of the second feedback circuit makes the triggering of over-voltage OV and under-voltage UV alarms and corresponding mechanisms to refresh the capacitor voltage dispensable. In particular, pull-up and pull-down mechanisms for correcting the capacitor voltage after a voltage drift has occurred are no longer required. Similarly, alternative solutions based e.g. on low-dropout LDO regulators attached to the flying capacitor in order to regulate the capacitor voltage may be omitted. As an additional advantage, the usage of dedicated, temporary switching states enables a smooth integration of a capacitor voltage regulation into the switching pattern of the multi-level power converter and therefore a reduction in audible noise compared to known solutions.

The second feedback circuit may be configured to generate said temporary control signals for controlling the switching elements in the temporary switching state during a time interval between a preceding switching state and a subsequent switching state, wherein both the preceding and the subsequent switching states are selected by the first feedback circuit from said plurality of switching states. In other words, the temporary switching state is timely sandwiched between the preceding switching state and the subsequent switching state, and the second feedback circuit is used for actively controlling the transition from the preceding switching state to the subsequent switching state. During this transition, the capacitor voltage may be charged or discharged by the inductor current flowing. For example, the temporary switching state of the second feedback circuit may not be one of the plurality of switching states of the first feedback circuit. Put in a different way, the temporary switching state may be different from the plurality of switching states generated by the first feedback circuit. As already mentioned in the foregoing, the multi-level power converter may be operated in a low load mode, only alternating between a first switching state and a second switching state. That is, the plurality of switching states may include a first switching state and a second switching state, wherein in the first switching state the first and the second switching elements are turned off and the third and the fourth switching elements are turned on, and wherein in the second switching state the first and the second switching elements are turned on and the third and the fourth switching elements are turned off. The temporary switching state selected by the second feedback circuit may thus be different from said first and second switching state used in low load mode.

Further, the second feedback circuit may comprise a delay circuit configured to receive at least one of the control signals generated by the first feedback circuit, and to generate at least one of the temporary control signals by delaying said at least one control signal by a delay interval. The delay interval may be e.g. in the range of 25 to 200 nsec, and may be e.g. 50 nsec. The second feedback circuit may be configured to determine the delay interval such that a frequency of voltage change of the capacitor voltage is outside of an audible frequency band.

At this, the delay interval may correspond to the duration of the temporary switching state. During this temporary switching state, e.g. the turning off of a particular switching element may be delayed, allowing the inductor current to flow through said particular switching element during the temporary switching state for charging or discharging the flying capacitor as needed. More specifically, the first feedback circuit may be configured to generate two control signals for turning off the first and the second switching element almost simultaneously. The second feedback circuit may then be configured to select one of the two control signals based on the capacitor voltage, and to delay the selected one of the two control signals by a delay interval such that the flying capacitor is charged or discharged by the inductor current during said delay interval.

In the following description, it will be explained in more detail which control signals of the first feedback circuit have to be delayed in order (a) redirect the inductor current to or from the flying capacitor, and (b) to achieve an appropriate regulation of the capacitor voltage. Although the ideas presented in the present document may be applied to various types of multi-level power converters such as e.g. multi-level buck converters, multi-level boost converters or multi-level buck/boost converters, the following description will focus on the two special cases of multi-level buck converters and multi-level boost converters without loss of generality.

In a multi-level buck converter, an input voltage of the multi-level buck converter may be applied to an input terminal of the first switching element, an output terminal of the fourth switching element may be connected to ground. Moreover, the output voltage and/or the output current of the multi-level buck converter may be provided at an output terminal of the inductor.

In such a multi-level buck converter, the second feedback circuit may be configured to generate, if the capacitor voltage is below a target voltage value, a first temporary control signal for turning off the first switching element by delaying a first control signal generated by the first feedback circuit for turning off the first switching element. At the same time, the second feedback circuit may be configured to generate, if the capacitor voltage is below the target voltage value, the second temporary control signal for turning off the second switching element by forwarding a second control signal generated by the first feedback circuit for turning off the second switching element. As a result, the first temporary control signal is delayed with regard to the second temporary control signal, and during this delay, a charging path is formed by the first switching element, the flying capacitor, a body diode of the third switching element (or alternatively through the third switching element itself in case the third switching element is still turned on) and the inductor. In the described situation, the flying capacitor is charged via said charging path during said delay.

The other way round, the second feedback circuit may be configured to generate, if the capacitor voltage is larger than the target voltage value, a second temporary control signal for turning off the second switching element by delaying a second control signal generated by the first feedback circuit for turning off the second switching element. At the same time, the second feedback circuit may be configured to generate, if the capacitor voltage is larger than the target voltage to value, the first temporary control signal for turning off the first switching element by forwarding the first control signal generated by the first feedback circuit for turning off the first switching element. As a result, the second temporary control signal is delayed with regard to the first temporary control signal, and during this delay, a discharging path is formed by a body diode of the fourth switching element (or alternatively through the fourth switching element itself in case the fourth switching element is still turned on), the flying capacitor, the second switching element and the inductor. In the described situation, the flying capacitor is discharged via said discharging path during said delay.

In a multi-level boost converter, an input voltage is applied to an input terminal of the inductor, an output terminal of the fourth switching element is connected to ground, and the output voltage and/or the output current of the multi-level boost converter is provided at an output terminal of the first switching element.

In such a multi-level boost converter, the second feedback circuit may be configured to generate, if the capacitor voltage is larger than the target voltage value, a third temporary control signal for turning off the third switching element by delaying a third control signal generated by the first feedback circuit for turning off the third switching element. At the same time, the second feedback circuit may be configured to generate, if the capacitor voltage is larger than a target voltage value, the fourth temporary control signal for turning off the fourth switching element by forwarding a fourth control signal generated by the first feedback circuit for turning off the fourth switching element. As a result, the third temporary control signal is delayed with regard to the fourth temporary control signal, and during this delay, a discharging path is formed by the inductor, the third switching element, the flying capacitor, and a body diode of the first switching element (or alternatively through the first switching element itself in case the first switching element is still turned on). In the described situation, the flying capacitor is discharged via said discharging path during said delay.

The other way round, the second feedback circuit may be configured to generate, if the capacitor voltage is below the target voltage value, a fourth temporary control signal for turning off the fourth switching element by delaying a fourth control signal generated by the first feedback circuit for turning off the fourth switching element. At the same time, the second feedback circuit may be configured to generate, if the capacitor voltage is below the target voltage value, the third temporary control signal for turning off the third switching element by forwarding the third control signal generated by the first feedback circuit for turning off the third switching element. As a result, the fourth temporary control signal is delayed compared to the third temporary control signal, and during this delay, a charging path is formed by the inductor, a body diode of the second switching element (or alternatively through the second switching element itself in case the second switching element is still turned on), the flying capacitor, and the fourth switching element. In the described situation, the flying capacitor is charged via said charging path during said delay.

The second feedback circuit may comprise the delay circuit, a comparator, and at least one multiplexer. The delay circuit may be configured to generate delayed control signals by delaying the control signals generated by the first feedback circuit. The comparator may be configured to compare the capacitor voltage against a target capacitor voltage. The at least one multiplexer may be configured to forward, based on a comparison result generated by the comparator, either a control signal generated by the first feedback circuit or a delayed control signal generated by the second feedback circuit for controlling the switching behavior of one of the switching elements. Additionally, a hysteresis of the comparator may be selected such that a frequency of voltage change of the capacitor voltage is outside of an audible frequency band. Additionally or alternatively, a second comparator may be provided for forming a time window for comparing the capacitor voltage against the target capacitor voltage, thereby reducing the ripple of the regulated capacitor voltage and ultimately audible noise.

According to another aspect, a method of operating a multi-level power converter is presented. The multi-level power converter may comprise a first switching element, a second switching element, a third switching element, a fourth switching element, an inductor, and a flying capacitor. The first terminal of said inductor may be connected to a switching terminal connecting the second switching element and the third switching element. A first terminal of said flying capacitor may be connected to a terminal connecting the first switching element and the second switching element. A second terminal of said flying capacitor may be connected to a terminal connecting the third switching element and the fourth switching element. The method may comprise generating, by a first feedback circuit, control signals for setting the switching elements in a plurality of switching states for regulating an output voltage or an output current of the multi-level power converter. The method may further comprise generating, by a second feedback circuit, based on a capacitor voltage across the flying capacitor, temporary control signals for setting the switching elements in a temporary switching state in which the flying capacitor is charged or discharged using an inductor current flowing through the inductor.

The second feedback circuit may generate said temporary control signals for controlling the switching elements in the temporary switching state during a time interval between a preceding switching state and a subsequent switching state, wherein both the preceding and the subsequent switching states are selected by the first feedback circuit from said plurality of switching states. At this, the temporary switching state of the second feedback circuit may not be one of the plurality of switching states of the first feedback circuit. Further, the plurality of switching states may include a first switching state and a second switching state, wherein in the first switching state the first and the second switching elements are turned off and the third and the fourth switching elements are turned on, and wherein in the second switching state the first and the second switching elements are turned on and the third and the fourth switching elements are turned off.

The method may comprise receiving, by the second feedback circuit, at least one of the control signals generated by the first feedback circuit. Also, the method may comprise generating, by the second feedback circuit, at least one of the temporary control signals by delaying said at least one control signal by a delay interval. The delay interval may be determined by the second feedback circuit such that a frequency of voltage change of the capacitor voltage is outside of an audible frequency band. Specifically, the method may further comprise generating, by the first feedback circuit, two control signals for turning off the first and the second switching element almost simultaneously. The method may further comprise selecting, by the second feedback circuit, one of the two control signals based on the capacitor voltage. The method may further comprise delaying, by the second feedback circuit, the selected one of the two control signals by a delay interval such that the flying capacitor is charged or discharged by the inductor current during said delay interval.

If the capacitor voltage is below a target voltage value, a first temporary control signal for turning off the first switching element may be generated by delaying a first control signal generated by the first feedback circuit for turning off the first switching element. Alternatively, if the capacitor voltage is larger than the target voltage value, a second temporary control signal for turning off the second switching element may be generated by delaying a second control signal generated by the first feedback circuit for turning off the second switching element.

Simultaneously, if the capacitor voltage is below the target voltage value, the second temporary control signal for turning off the second switching element may be generated by forwarding a second control signal generated by the first feedback circuit for turning off the second switching element. Alternatively, if the capacitor voltage is larger than the target voltage value, the first temporary control signal for turning off the first switching element may be generated by forwarding a first control signal generated by the first feedback circuit for turning off the first switching element.

If the capacitor voltage is larger than a target voltage value, a third temporary control signal for turning off the third switching element may be generated by delaying a third control signal generated by the first feedback circuit for turning off the third switching element. Alternatively, if the capacitor voltage is below the target voltage value, a fourth temporary control signal for turning off the fourth switching element may be generated by delaying a fourth control signal generated by the first feedback circuit for turning off the fourth switching element for turning off the fourth switching element.

Simultaneously, if the capacitor voltage is larger than the target voltage value, the fourth temporary control signal for turning off the fourth switching element may be generated by forwarding a fourth control signal generated by the first feedback circuit for turning off the fourth switching element. If the capacitor voltage is below the target voltage value, the third temporary control signal for turning off the third switching element may be generated by forwarding the third control signal generated by the first feedback circuit for turning off the third switching element.

Alternatively or additionally, the method may comprise generating, the delay circuit of the second feedback circuit, delayed control signals by delaying the control signals generated by the first feedback circuit. The method may comprise comparing, by a comparator of the second feedback circuit, the capacitor voltage against a target capacitor voltage. The method may comprise forwarding, by at least one multiplexer of the second feedback circuit, based on a comparison result generated by the comparator, either a control signal generated by the first feedback circuit or a delayed control signal generated by the second feedback circuit for controlling the switching behavior of one of the switching elements. A hysteresis of the comparator may be selected such that a frequency of voltage change of the capacitor voltage is outside of an audible frequency band.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple", "connect", "coupled" or "connected" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 1A:
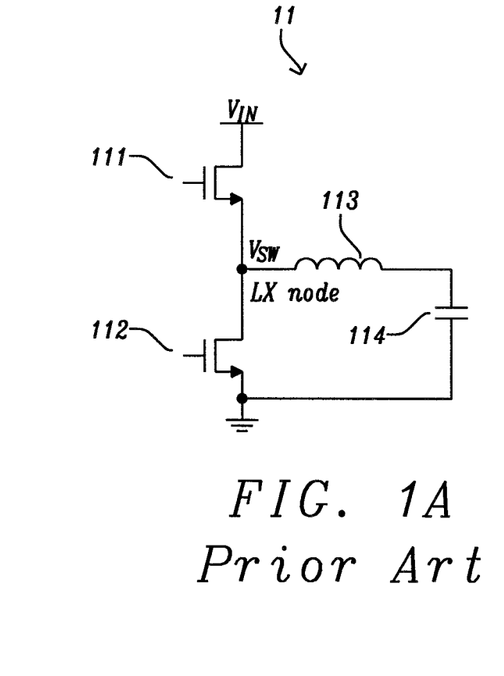
FIG. 1A shows a buck converter.
Figure 1B:
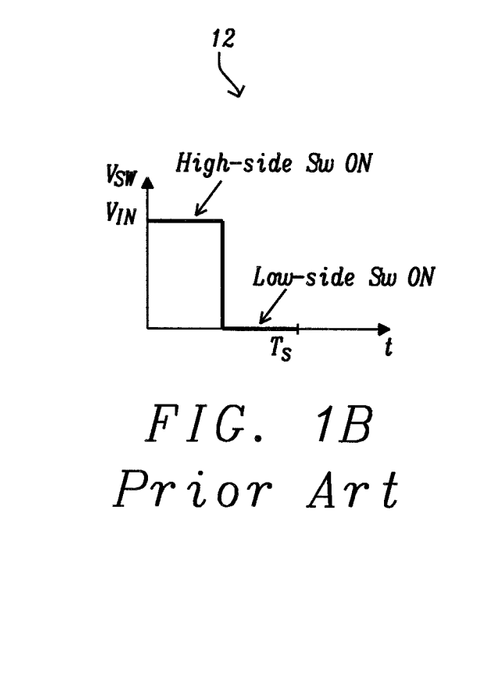
FIG. 1B shows a graph of the operation of a buck converter.

FIG. 1A shows a buck converter 11 which is known from the prior art. Historically, the buck converter topology has been widely deployed for battery operated devices where the input voltage source is provided by a universal serial bus USB-type adapter. A high-side switch 111 is arranged between an inductor input node of inductor 113 and an input voltage. A low-side switch 112 is arranged between said inductor input node and ground. Finally, an output capacitor 114 is arranged between an inductor output node of inductor 113 and ground. In addition, in FIG. 1B, diagram 12 illustrates the voltage at the inductor input node of inductor 113 over time. During a first time interval, the high-side switch 111 is turned on and during a second time interval, the low-side switch 112 is turned on. The two switches are placed in the ON state in alternating cycles, and the duty cycle of each cycle provides the required output voltage regulation.

In order to increase the operational efficiency of the buck converter, much effort has been placed into reducing the ON time resistance of the switches (i.e. the drain-source-resistance Rds-on) in order to reduce losses. Unfortunately, once the output field-effect transistor FET gate overdrive is maximized, reducing the drain-source-resistance Rds-on results in a greater parasitic capacitance, resulting in a trade-off between conduction losses and switching losses.

Another issue regarding standard buck converters highlighted in FIG. 1A is that the voltage at the inductor input node of inductor 113 swings between the input voltage Vin (when the high-side switch is ON), and ground (when the low-side switch is ON). This results in substantial switching losses of the power converter and core loss dissipated by the inductor due to the high root mean square RMS voltage across the inductor.

Figure 2A:
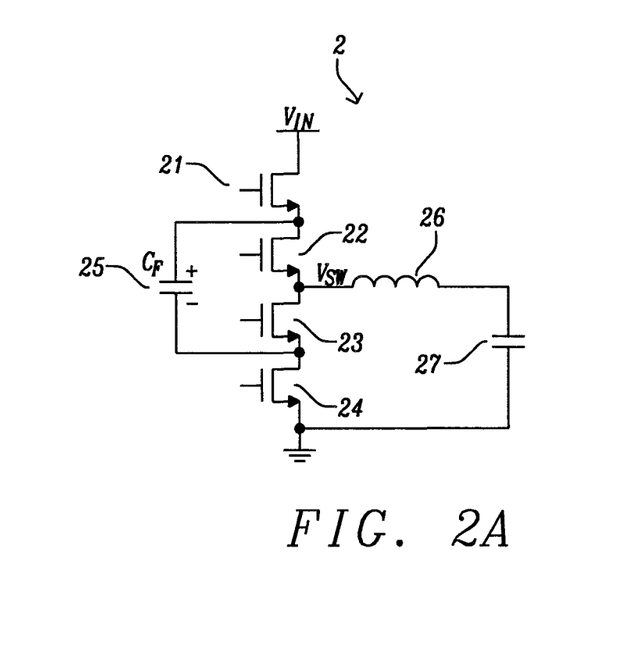
FIG. 2A shows a multi-level buck converter.

A topology that holds promise to alleviate many of the shortcomings of the buck converter is the multi-level buck converter 2, as shown in FIG. 2A. The illustrated, exemplary multi-level buck converter 2 comprises a first switching element 21, a second switching element 22, a third switching element 23, a fourth switching element 24, an inductor 26, a flying capacitor 25, and an optional output capacitor 27. A first terminal of said inductor 26 may be connected to a switching terminal connecting the second switching element 22 and the third switching element 23. A first terminal of said flying capacitor 25 may be connected to a terminal connecting the first switching element 21 and the second switching element 22, and a second terminal of said flying capacitor 25 may be connected to a terminal connecting the third switching element 23 and the fourth switching element 24.

Figure 2B:
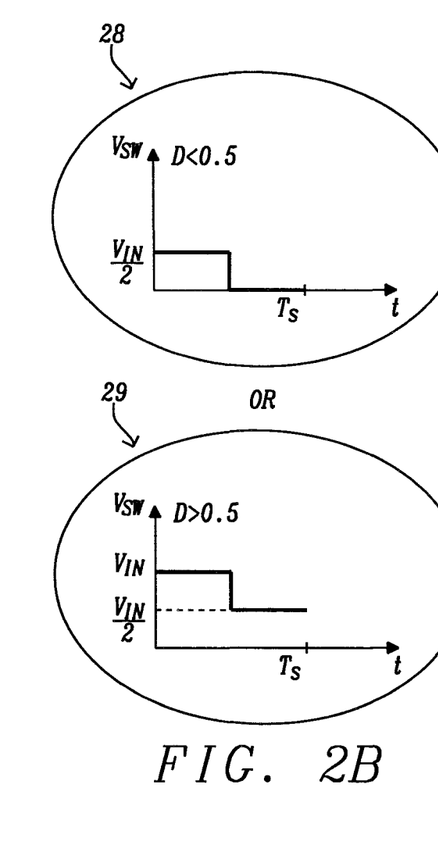
FIG. 2B shows graphs of the operation of a multi-level buck converter.

The voltage at the first terminal of said inductor 26 may switch between V_IN and V_IN/2, if V_IN>V_OUT>V_IN/2, and may switch between V_IN/2 and ground, if V_IN/2>V_OUT>ground, wherein V_IN denotes the input voltage and V_OUT denotes the output voltage. In FIG. 2B, diagrams 28 and 29 show the voltage at the first terminal of said inductor 26 over time for the two different duty cycles.

A major aspect of the multi-level buck topology is that the RMS voltage at the first terminal of the inductor 26 is 50% of the corresponding voltage of a traditional buck converter. In addition to reducing the RMS voltage and RMS current across and through the inductor, the voltage across the switching elements are also reduced, thus lowering switching losses. Furthermore, transistors with lower breakdown voltage ratings typically have lower Rds-on characteristics, reducing conductive losses.

Figure 3A:
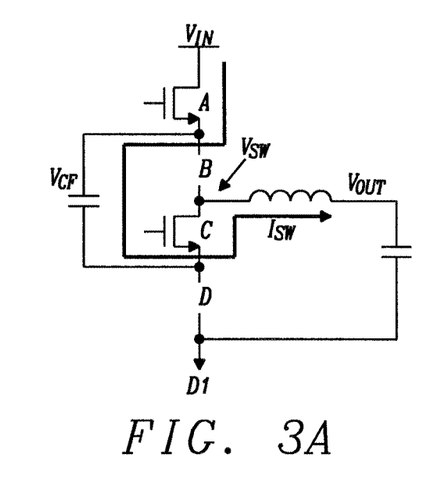
FIGS. 3A, 3B, 3C and 3D show different switching states of a multi-level buck converter.
Figure 3B:
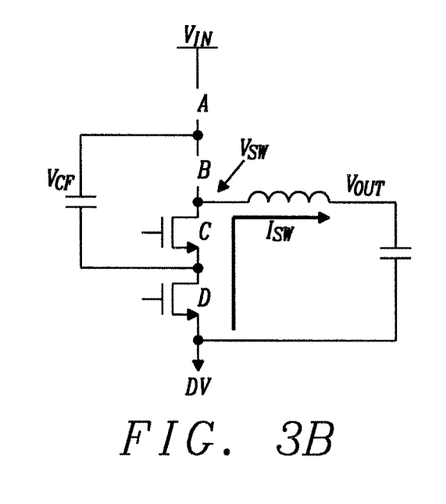
Figure 3C:
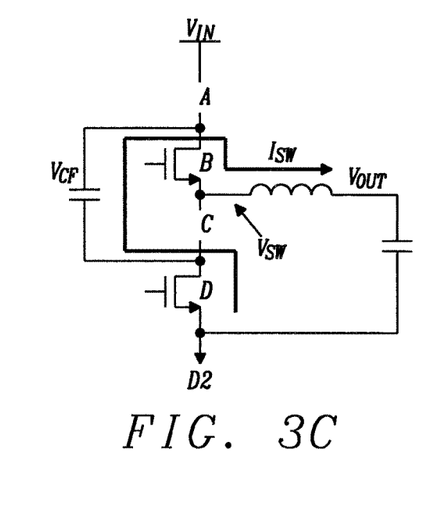

FIGS. 3A, 3B, 3C and 3D show 4 different switching states of a multi-level buck converter. In FIG. 3A, in switching state D1, the first and the third switching elements are turned on, while the second and the fourth switching elements are turned off. In FIG. 3B, in switching state DV, the third and the fourth switching elements are turned on, while the first and the second switching elements are turned off. In FIG. 3C, in switching state D2, the second and the fourth switching elements are turned on, while the first and the third switching elements are turned off. Finally, in FIG. 3D, in switching state DP, the first and the second switching elements are turned on, while the third and the fourth switching elements are turned off. The arrow denoted with $I_{SW}$ indicates the flow of current delivered to the output of the multi-level buck converter.

Figure 3D:
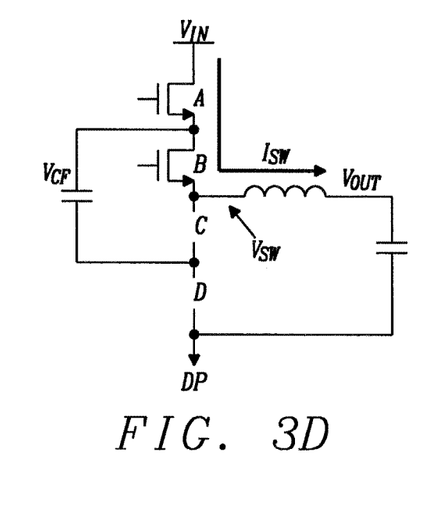
Figure 4:
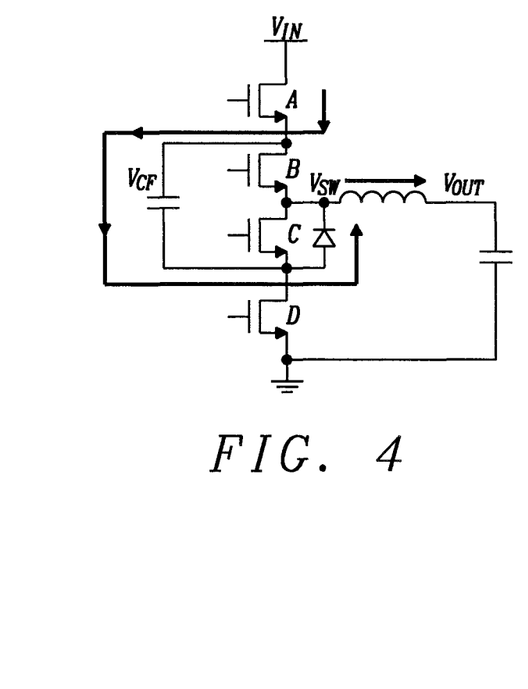
FIG. 4 shows a temporary switching state of a multi-level buck converter during which a flying capacitor is charged.
Figure 5:
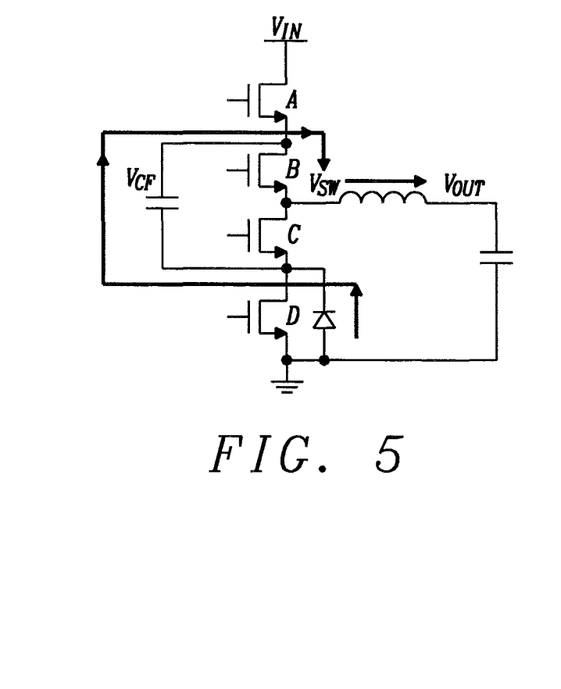
FIG. 5 shows another temporary switching state of a multi-level buck converter during which a flying capacitor is discharged.

At very light loads, the multi-level buck converter may not use all four switching states but instead in FIGS. 3D and 3B, switches between the two switching states DP and DV so that the multi-level buck converter devolves into a state comparable to a conventional buck converter. This mode of operation may be referred to as low load operation. Ideally, during low load operation, the flying capacitor floats such that it is neither charged nor discharged. But non-idealities in the DP-DV transition cause the flying capacitor voltage to either charge high to the input voltage V_IN or discharge to ground. In particular, FIG. 3 illustrates that the first and the second switching elements (transistors A and B, respectively) must both turn off in the DP-DV transition. Ideally, both switching elements switch off at the same time. But in reality, either transistor A or transistor B will be the first in the pair to switch off. If transistor B switches off before transistor A, the flying capacitor voltage is charged in the DP-DV transition. As is illustrated in FIG. 4, a charging path goes through transistor A, the flying capacitor, and the body diode of transistor C (i.e. the third switching element). Conversely, suppose that transistor A switches off before transistor B does. In that case, the flying capacitor voltage is discharged as depicted in FIG. 5. In this scenario, the discharge path is through the body diode of transistor D (i.e. the fourth switching element), the flying capacitor, and transistor B.

The resulting charging or discharging of the flying capacitor may trigger fault conditions. In particular, the charging of the flying capacitor may cause an over-voltage (OV) alarm, whereas the discharging may trigger an under-voltage (UV) alarm. In response to the OV alarm, the flying capacitor voltage may be lowered, whereas the flying capacitor voltage may be increased in response to the UV alarm. But the triggering of these alarm conditions wastes power and also may cause audible noise.

Figure 6:
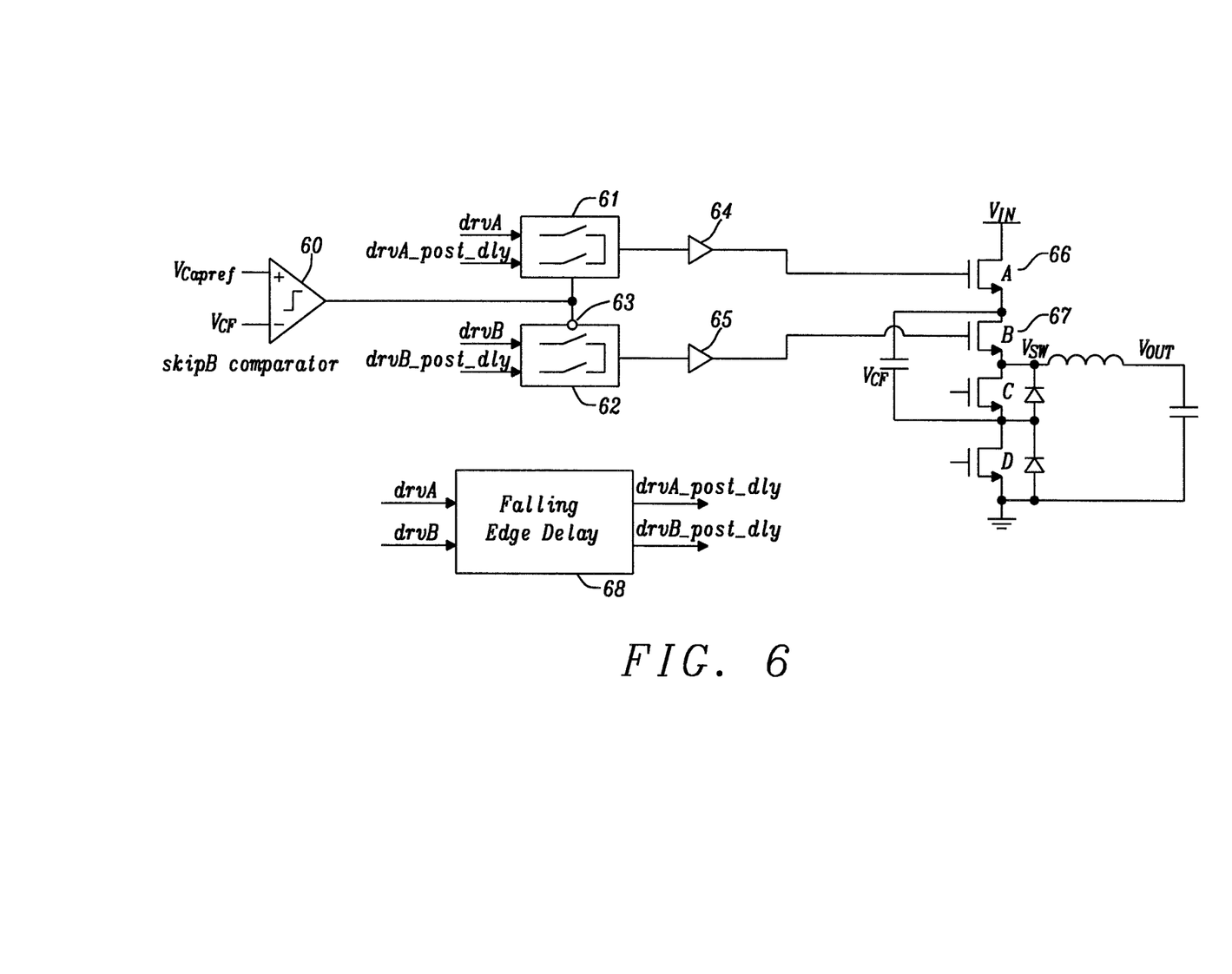
FIG. 6 shows an exemplary circuit for regulating a capacitor voltage of a flying capacitor of a multi-level buck converter.

FIG. 6 shows an exemplary circuit for regulating a capacitor voltage of a flying capacitor of a multi-level buck converter. In the illustrated exemplary circuit, the same mechanism which may prevent floating of the flying capacitor in low load operation (see FIGS. 4 and 5, i.e. the mechanism which causes undesired charging and discharging of the flying capacitor) is exploited to actively regulate the voltage of the flying capacitor towards a desired level. A comparator 60 compares the flying capacitor voltage to a reference voltage to determine whether the flying capacitor voltage is greater than or less than a desired value (e.g. half of the input voltage, VIN/2). Should the flying capacitor voltage be higher than desired, the switch-off (e.g. the falling edge) for transistor B (the second switching element 67) is delayed with respect to the switch-off time for transistor A (the first switching element 66). Conversely, if the flying capacitor is lower than desired, the switch-off time for transistor A is delayed with respect to the falling edge for transistor B. To reduce noise, the comparator may include hysteresis.

As illustrated in FIG. 6, the exemplary circuit for regulating a capacitor voltage may comprise a delay circuit 68 configured to receive control signals drvA and drvB generated by a first feedback circuit (not shown). The first feedback circuit may be configured to generate the control signals drvA and drvB for setting the switching elements in a plurality of switching states for regulating an output voltage or an output current of the multi-level buck converter. The delay circuit 68 may then be configured to generate temporary control signals drvA_post_dly and drvB_post_dly by delaying said control signals drvA and drvB by a predetermined or variable delay interval. For example, the delay circuit 68 may be configured to delay said control signals by a variable delay interval based on a voltage difference between a target voltage value of the capacitor voltage and an actual capacitor voltage. At this, a longer delay interval may be chosen in case of a larger voltage difference, whereas a shorter delay interval may be chosen in case of a smaller voltage difference. Two multiplexers 61 and 62 are configured to forward either the original control signals drvA and drvB generated by the first feedback circuit or the temporary control signals drvA_post_dly and drvB_post_dly generated by the delay circuit 68. At this, it should be noted that the second multiplexer 62 is coupled to the output of the comparator 60 via an inverter circuit 63, such that multiplexer 62 always forwards an original control signal whenever multiplexer 61 forwards a temporary control signal and vice versa. In addition, FIG. 6 shows two optional driving circuits 64 and 65 for driving the first switching element 66 and the second switching element 67, respectively.

As can be seen in the FIG. 6, the comparator output may e.g. go low once the flying capacitor voltage is sufficiently higher by the hysteresis margin than the desired value (VCapref). This low state may trigger the first multiplexer 61 to select for a falling-edge-delayed version of the drive signal for transistor B and also triggers the second multiplexer 62 to select for the non-delayed version of the drive signal for transistor A. Conversely, if the flying capacitor voltage is sufficiently lower by the hysteresis margin of the desired value Vcapref, the comparator output signal will go high to trigger the opposite selection by the two multiplexers 61, 62. The drive signal for transistor A will thus have a delayed falling edge as compared to the drive signal for transistor B.

The resulting low load regulation of the flying capacitor voltage is advantageous with regard to 1) conserving power, 2) preventing the activation of over-voltage or under-voltage alarms for the flying capacitor voltage, and 3) keeping the flying capacitor voltage ripple away from the audible range through appropriate selection of the hysteresis margin and filtering frequency.

Figure 7:
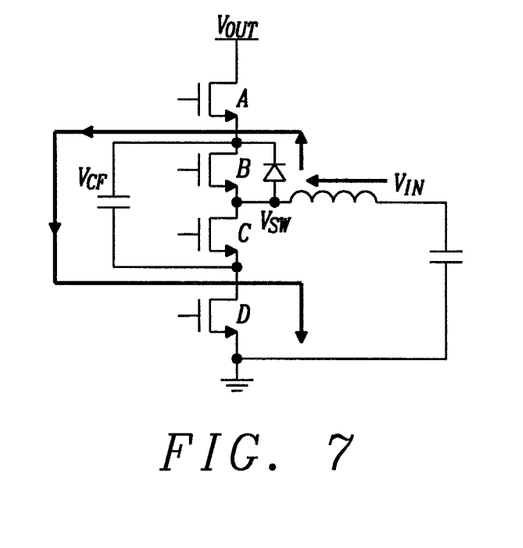
FIG. 7 shows a temporary switching state of a multi-level boost converter during which a flying capacitor is charged.
Figure 8:
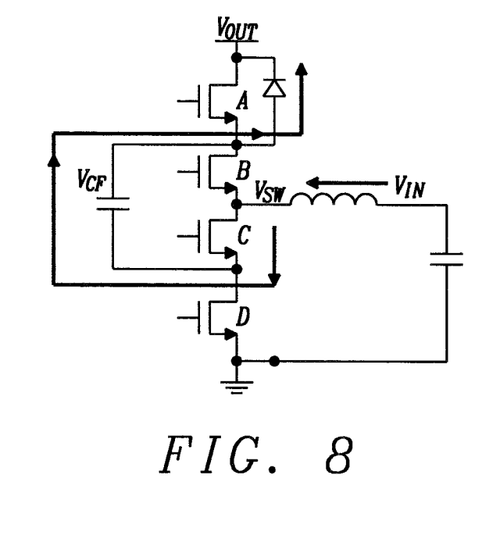
FIG. 8 shows another temporary switching state of a multi-level boost converter during which a flying capacitor is discharged.
Figure 9:
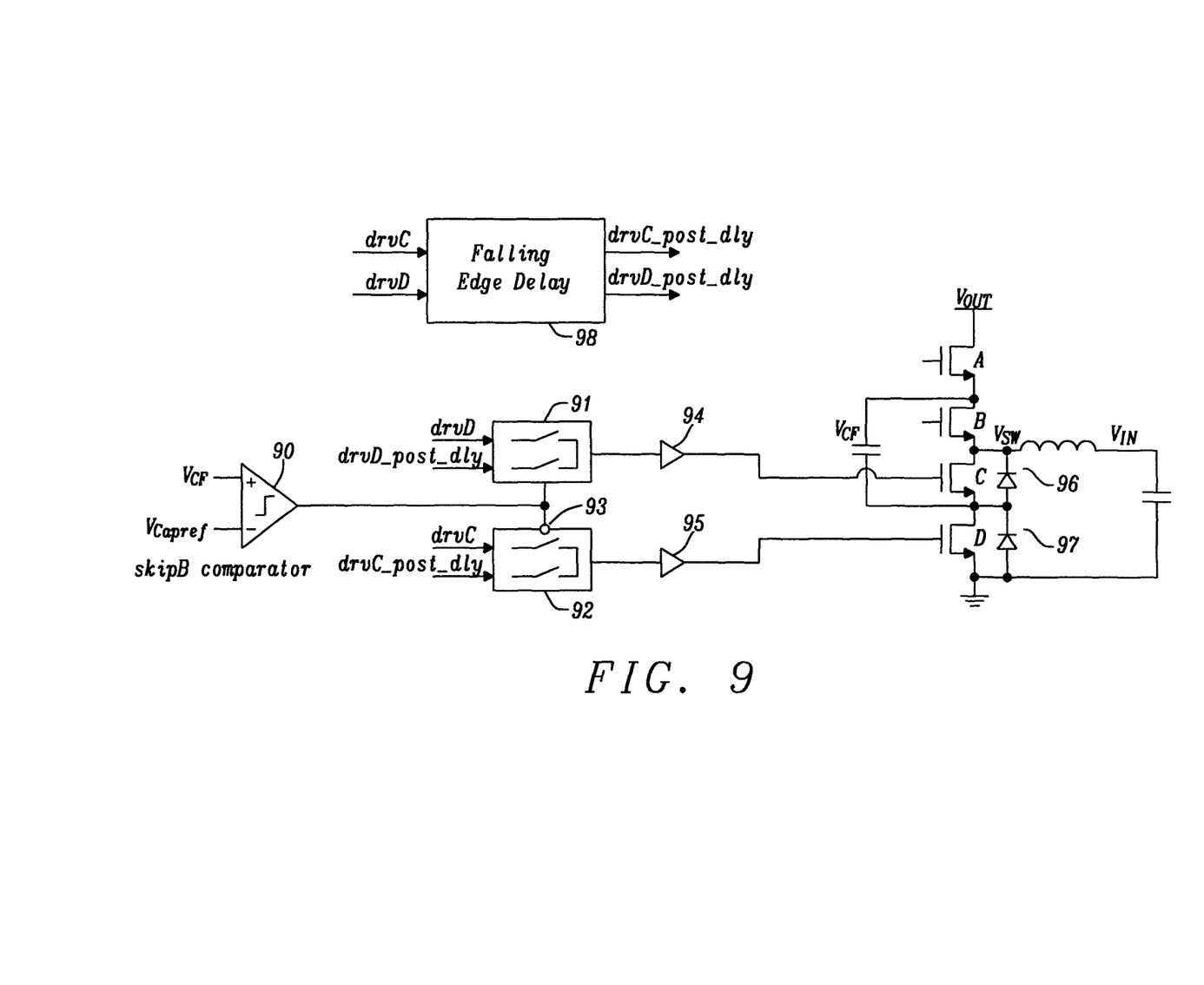
FIG. 9 shows an exemplary circuit for regulating a capacitor voltage of a flying capacitor of a multi-level boost converter.

FIG. 7 shows a temporary switching state of a multi-level boost converter during which a flying capacitor may be charged. Analogously, FIG. 8 shows another temporary switching state of a multi-level boost converter during which a flying capacitor is discharged. FIG. 9 shows an exemplary circuit for regulating a capacitor voltage of a flying capacitor of a multi-level boost converter. A comparator 90 compares the flying capacitor voltage to a reference voltage to determine whether the flying capacitor voltage is greater than or less than a desired value. As illustrated in FIG. 9, the exemplary circuit for regulating a capacitor voltage may comprise a delay circuit 98 configured to receive control signals drvC and drvD generated by a first feedback circuit (not shown). The first feedback circuit may be configured to generate the control signals for setting the switching elements in a plurality of switching states for regulating the output voltage or an output current of the multi-level boost converter. The delay circuit 98 may then be configured to generate temporary control signals drvC_post_dly and drvD_post_dly by delaying said control signals drvC and drvD by a predetermined or variable delay interval. For example, the delay circuit 98 may be configured to delay said control signals by a variable delay interval based on a voltage difference between a target voltage value of the capacitor voltage and an actual capacitor voltage. At this, a longer delay interval may be chosen in case of a larger voltage difference, whereas a shorter delay interval may be chosen in case of a smaller voltage difference. Two multiplexers 91 and 92 are configured to forward either the original control signals generated by the first feedback circuit or the temporary control signals generated by the delay circuit 98. At this, it should be noted that the second multiplexer 62 is coupled to the output of the comparator 90 via an inverter circuit 93, such that multiplexer 92 always forwards an original control signal whenever multiplexer 91 forwards a temporary control signal and vice versa. In addition, FIG. 9 shows two optional driving circuits 94 and 95 for driving the third switching element 96 and the second switching element 97, respectively.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A multi-level power converter comprising:
    a first switching element, a second switching element, a third switching element, and a fourth switching element;
    an inductor, wherein a first terminal of said inductor is connected to a switching terminal connecting the second switching element and the third switching element;
    a flying capacitor, wherein a first terminal of said flying capacitor is connected to a terminal connecting the first switching element and the second switching element, and wherein a second terminal of said flying capacitor is connected to a terminal connecting the third switching element and the fourth switching element;
    a first feedback circuit configured to generate control signals for setting the switching elements in a plurality of switching states for regulating an output voltage or an output current of the multi-level power converter; and
    a second feedback circuit configured to generate, based on a capacitor voltage across the flying capacitor, temporary control signals for setting the switching elements in a temporary switching state in which the flying capacitor is charged or discharged using an inductor current flowing through the inductor; wherein
    the first feedback circuit is configured to generate a first control signal and a second control signal both included within said control signals, the first control signal and the second control signal are configured for correspondingly turning off the first and the second switching elements almost simultaneously, and
    the second feedback circuit is configured to select one of the first control signal and the second control signal based on the capacitor voltage, and generate a respective first temporary control signal or second temporary control signal both included within said temporary control signals, by delaying the selected one of the first control signal and the second control signal by a delay interval such that the flying capacitor is charged or discharged by the inductor current during said delay interval.

2. The multi-level power converter of claim 1, wherein the second feedback circuit is configured to generate said temporary control signals for controlling the switching elements in the temporary switching state during a time interval between a preceding switching state and a subsequent switching state, wherein both the preceding and the subsequent switching states are selected by the first feedback circuit from said plurality of switching states.

3. The multi-level power converter of claim 1, wherein the temporary switching state of the second feedback circuit is not one of the plurality of switching states of the first feedback circuit.

4. The multi-level power converter of claim 1, wherein the plurality of switching states includes a first switching state and a second switching state, wherein in the first switching state the first and the second switching elements are turned off and the third and the fourth switching elements are turned on, and wherein in the second switching state the first and the second switching elements are turned on and the third and the fourth switching elements are turned off.

5. The multi-level power converter of claim 1, wherein the second feedback circuit is configured to determine the delay interval such that a frequency of voltage change of the capacitor voltage is outside of an audible frequency band.

6. The multi-level power converter of claim 1, wherein the second feedback circuit is configured to
    if the capacitor voltage is below a target voltage value, generate the first temporary control signal for turning off the first switching element by delaying the first control signal generated by the first feedback circuit for turning off the first switching element, or
    if the capacitor voltage is larger than the target voltage value, generate the second temporary control signal for turning off the second switching element by delaying the second control signal generated by the first feedback circuit for turning off the second switching element.

7. The multi-level power converter of claim 1, wherein the second feedback circuit is configured to if the capacitor voltage is below a target voltage value, generate the second temporary control signal for turning off the second switching element by forwarding the second control signal generated by the first feedback circuit for turning off the second switching element, or if the capacitor voltage is larger than the target voltage value, generate the first temporary control signal for turning off the first switching element by forwarding the first control signal generated by the first feedback circuit for turning off the first switching element.

8. A method of operating a multi-level power converter comprising a first switching element, a second switching element, a third switching element, a fourth switching element, an inductor, and a flying capacitor, wherein a first terminal of said inductor is connected to a switching terminal connecting the second switching element and the third switching element, wherein a first terminal of said flying capacitor is connected to a terminal connecting the first switching element and the second switching element, and wherein a second terminal of said flying capacitor is connected to a terminal connecting the third switching element and the fourth switching element, the method comprising the steps of:

generating, by a first feedback circuit, control signals for setting the switching elements in a plurality of switching states for regulating an output voltage or an output current of the multi-level power converter;

generating, by a second feedback circuit, based on a capacitor voltage across the flying capacitor, temporary control signals for setting the switching elements in a temporary switching state in which the flying capacitor is charged or discharged using an inductor current flowing through the inductor;

generating, by the first feedback circuit, a first control signal and a second control signal both included within said control signals, the first control signal and the second control signal configured for correspondingly turning off the first and the second switching elements almost simultaneously, selecting, by the second feedback circuit, one of the first control signal and the second control signal based on the capacitor voltage, and generate a respective first temporary control signal or second temporary control signal both included within said temporary control signals, by delaying, by the second feedback circuit, the selected one of the first control signal and the second control signal by a delay interval such that the flying capacitor is charged or discharged by the inductor current during said delay interval.

9. The method of claim 8, further comprising the step of:
- generating, by the second feedback circuit, said temporary control signals for controlling the switching elements in the temporary switching state during a time interval between a preceding switching state and a subsequent switching state, wherein both the preceding and the subsequent switching states are selected by the first feedback circuit from said plurality of switching states.

10. The method according to claim 8, wherein the temporary switching state of the second feedback circuit is not one of the plurality of switching states of the first feedback circuit.

11. The method according to claim 8, wherein the plurality of switching states includes a first switching state and a second switching state, wherein in the first switching state the first and the second switching elements are turned off and the third and the fourth switching elements are turned on, and wherein in the second switching state the first and the second switching elements are turned on and the third and the fourth switching elements are turned off.

12. The method according to claim 8, further comprising the step of: determining, by the second feedback circuit, the delay interval such that a frequency of voltage change of the capacitor voltage is outside of an audible frequency band.

13. The method according to claim 8, further comprising the steps of:

if the capacitor voltage is below a target voltage value, generating the first temporary control signal for turning off the first switching element by delaying the first control signal generated by the first feedback circuit for turning off the first switching element, or if the capacitor voltage is larger than the target voltage value, generating the second temporary control signal for turning off the second switching element by delaying the second control signal generated by the first feedback circuit for turning off the second switching element.

14. The method according to claim 13, further comprising the steps of:

if the capacitor voltage is below the target voltage value, generating the second temporary control signal for turning off the second switching element by forwarding the second control signal generated by the first feedback circuit for turning off the second switching element, or if the capacitor voltage is larger than the target voltage value, generating the first temporary control signal for turning off the first switching element by forwarding the first control signal generated by the first feedback circuit for turning off the first switching element.

15. A multi-level power converter comprising:
a first switching element, a second switching element, a third switching element, and a fourth switching element;

an inductor, wherein a first terminal of said inductor is connected to a switching terminal connecting the second switching element and the third switching element;

a flying capacitor, wherein a first terminal of said flying capacitor is connected to a terminal connecting the first switching element and the second switching element, and wherein a second terminal of said flying capacitor is connected to a terminal connecting the third switching element and the fourth switching element;

a first feedback circuit configured to generate control signals for setting the switching elements in a plurality of switching states for regulating an output voltage or an output current of the multi-level power converter; and a second feedback circuit configured to generate, based on a capacitor voltage across the flying capacitor, temporary control signals for setting the switching elements in a temporary switching state in which the flying capacitor is charged or discharged using an inductor current flowing through the inductor; wherein the first feedback circuit is configured to generate a third control signal and a fourth control signal both included within said control signals, the third control signal and the fourth control signal are configured for correspondingly turning off the third and the fourth switching element almost simultaneously, and the second feedback circuit is configured to select one of the third control signal and the fourth control signal based on the capacitor voltage, and generate a respective third temporary control signal or fourth temporary control signal both included within said temporary control signals, by delaying the selected one of the third control signal and the fourth control signal by a delay interval such that the flying capacitor is charged or discharged by the inductor current during said delay interval.

16. The multi-level power converter of claim 15, wherein the second feedback circuit is configured to
if the capacitor voltage is larger than a target voltage value, generate the third temporary control signal for turning off the third switching element by delaying the third control signal generated by the first feedback circuit for turning off the third switching element, or
if the capacitor voltage is below the target voltage value, generate the fourth temporary control signal for turning off the fourth switching element by delaying the fourth control signal generated by the first feedback circuit for turning off the fourth switching element.

17. The multi-level power converter of claim 15, wherein the second feedback circuit is configured to
if the capacitor voltage is larger than a target voltage value, generate the fourth temporary control signal for turning off the fourth switching element by forwarding the fourth control signal generated by the first feedback circuit for turning off the fourth switching element, or
if the capacitor voltage is below the target voltage value, generate the third temporary control signal for turning off the third switching element by forwarding the third control signal generated by the first feedback circuit for turning off the third switching element.

18. A method of operating a multi-level power converter comprising a first switching element, a second switching element, a third switching element, a fourth switching element, an inductor, and a flying capacitor, wherein a first terminal of said inductor is connected to a switching terminal connecting the second switching element and the third switching element, wherein a first terminal of said flying capacitor is connected to a terminal connecting the first switching element and the second switching element, and wherein a second terminal of said flying capacitor is connected to a terminal connecting the third switching element and the fourth switching element, the method comprising the steps of:
generating, by a first feedback circuit, control signals for setting the switching elements in a plurality of switching states for regulating an output voltage or an output current of the multi-level power converter;
generating, by a second feedback circuit, based on a capacitor voltage across the flying capacitor, temporary control signals for setting the switching elements in a temporary switching state in which the flying capacitor is charged or discharged using an inductor current flowing through the inductor;
generating, by the first feedback circuit, a third control signal and a fourth control signal both included within said control signals, the third control signal and the fourth control signal are configured for correspondingly turning off the third and the fourth switching element almost simultaneously,
selecting, by the second feedback circuit, one of the third control signal and the fourth control signal based on the capacitor voltage, and generate a respective third temporary control signal or fourth temporary control signal both included within said temporary control signals, by delaying, by the second feedback circuit, the selected one of the third control signal and the fourth control signal by a delay interval such that the flying capacitor is charged or discharged by the inductor current during said delay interval.

19. The method according to claim 18, further comprising the steps of:
if the capacitor voltage is larger than a target voltage value, generating the third temporary control signal for turning off the third switching element by delaying the third control signal generated by the first feedback circuit for turning off the third switching element, or
if the capacitor voltage is below the target voltage value, generating the fourth temporary control signal for turning off the fourth switching element by delaying the fourth control signal generated by the first feedback circuit for turning off the fourth switching element for turning off the fourth switching element.

20. The method according to claim 19, further comprising the steps of:
if the capacitor voltage is larger than the target voltage value, generating the fourth temporary control signal for turning off the fourth switching element by delaying the fourth control signal generated by the first feedback circuit for turning off the fourth switching element, or
if the capacitor voltage is below the target voltage value, generating the third temporary control signal for turning off the third switching element by forwarding the third control signal generated by the first feedback circuit for turning off the third switching element.

21. A multi-level power converter comprising:
a first switching element, a second switching element, a third switching element, and a fourth switching element;
an inductor, wherein a first terminal of said inductor is connected to a switching terminal connecting the second switching element and the third switching element;
a flying capacitor, wherein a first terminal of said flying capacitor is connected to a terminal connecting the first switching element and the second switching element, and wherein a second terminal of said flying capacitor is connected to a terminal connecting the third switching element and the fourth switching element;
a first feedback circuit configured to generate control signals for setting the switching elements in a plurality of switching states for regulating an output voltage or an output current of the multi-level power converter; and
a second feedback circuit configured to generate, based on a capacitor voltage across the flying capacitor, temporary control signals for setting the switching elements in a temporary switching state in which the flying capacitor is charged or discharged using an inductor current flowing through the inductor;
wherein the second feedback circuit comprises
a delay circuit, wherein the delay circuit is configured to generate the temporary control signals by delaying the control signals generated by the first feedback circuit;
a comparator configured to compare the capacitor voltage against a target capacitor voltage; and
at least one multiplexer configured to forward, based on a comparison result generated by the comparator, either a control signal within the control signals generated by the first feedback circuit or a temporary control signal within the temporary control signals generated by the second feedback circuit for controlling the switching behavior of one of the switching elements.

22. A method of operating a multi-level power converter comprising a first switching element, a second switching element, a third switching element, a fourth switching element, an inductor, and a flying capacitor, wherein a first terminal of said inductor is connected to a switching terminal connecting the second switching element and the third switching element, wherein a first terminal of said flying capacitor is connected to a terminal connecting the first switching element and the second switching element, and wherein a second terminal of said flying capacitor is connected to a terminal connecting the third switching element and the fourth switching element, the method comprising the steps of:

generating, by a first feedback circuit, control signals for setting the switching elements in a plurality of switching states for regulating an output voltage or an output current of the multi-level power converter;

generating, by a second feedback circuit, based on a capacitor voltage across the flying capacitor, temporary control signals for setting the switching elements in a temporary switching state in which the flying capacitor is charged or discharged using an inductor current flowing through the inductor;

generating, by a delay circuit of the second feedback circuit, the temporary control signals by delaying the control signals generated by the first feedback circuit;

comparing, by a comparator of the second feedback circuit, the capacitor voltage against a target capacitor voltage; and forwarding, by at least one multiplexer of the second feedback circuit, based on a comparison result generated by the comparator, either a control signal within the control signals generated by the first feedback circuit or a temporary control signal within the temporary control signals generated by the second feedback circuit for controlling the switching behavior of one of the switching elements.

* * * * *